United States Patent
Takagi

(10) Patent No.: US 9,038,754 B2
(45) Date of Patent: May 26, 2015

(54) HYBRID VEHICLE

(75) Inventor: Izumi Takagi, Akashi (JP)

(73) Assignee: Kawasaki Jukogyo Kabushiki Kaisha, Kobe-shi (JP)

( * ) Notice: Subject to any disclaimer, the term of this patent is extended or adjusted under 35 U.S.C. 154(b) by 171 days.

(21) Appl. No.: 13/341,747

(22) Filed: Dec. 30, 2011

(65) Prior Publication Data

US 2013/0168178 A1   Jul. 4, 2013

(51) Int. Cl.
*B60K 6/42* (2007.10)
*B60K 5/06* (2006.01)
*B60K 6/20* (2007.10)
*B60K 1/04* (2006.01)
*B60K 5/00* (2006.01)

(52) U.S. Cl.
CPC ... *B60K 5/06* (2013.01); *B60K 6/20* (2013.01); *B60K 2001/0422* (2013.01); *B60K 2005/003* (2013.01); *B60Y 2200/124* (2013.01); *B60Y 2200/23* (2013.01); *B60Y 2200/86* (2013.01); *B60Y 2200/92* (2013.01)

(58) Field of Classification Search
USPC .......................................... 180/65.21–65.29
See application file for complete search history.

(56) References Cited

U.S. PATENT DOCUMENTS

| 3,796,277 | A  | * | 3/1974 | Gordon | 180/68.3 |
| 4,891,940 | A  | * | 1/1990 | Tamba et al. | 60/320 |
| 7,900,735 | B2 | * | 3/2011 | Iwaki et al. | 180/253 |
| 2002/0121780 | A1 | * | 9/2002 | Westerbeke, Jr. | 290/1 A |
| 2003/0130772 | A1 | * | 7/2003 | Yanagida et al. | 701/22 |
| 2004/0244346 | A1 | * | 12/2004 | Inui et al. | 56/11.9 |

FOREIGN PATENT DOCUMENTS

JP   2011-073582 A   4/2011

* cited by examiner

*Primary Examiner* — Jeffrey J Restifo
*Assistant Examiner* — Erez Gurari
(74) *Attorney, Agent, or Firm* — Alleman Hall McCoy Russell & Tuttle LLP

(57) ABSTRACT

A hybrid vehicle is provided. The hybrid vehicle may include an engine, an electric generator joined to the engine, and an electric drive motor, comprises a driver seat on which a driver is seated; and an engine room provided forward or rearward relative to the driver seat. Further, the engine is placed such that a crankshaft extends vertically, and a rotor of the electric generator is mounted to an upper end portion or a lower end portion of the crankshaft such that the rotor is rotatable integrally with the crankshaft.

17 Claims, 8 Drawing Sheets

HYBRID VEHICLE

BACKGROUND OF THE INVENTION

1. Field of the Invention

The present invention generally relates to a hybrid vehicle including an engine, an electric generator joined to the engine, and an electric drive motor. Particularly, the present invention relates to the layout of the engine and the electric generator.

2. Description of the Related Art

There has been known a hybrid vehicle including an engine and a drive motor as driving power sources, in which the engine, an electric generator, and the drive motor are arranged in an engine room in a front portion of the hybrid vehicle. Japanese Laid-Open Patent Application Publication No. 2011-73582 discloses a series-hybrid vehicle having a layout in which an engine which has a relatively small size and outputs a low driving power is placed such that its crankshaft extends in a vehicle width direction, the electric generator is joined to one end portion of the engine in the vehicle width direction, and the drive motor for driving front wheels is positioned forward relative to the engine.

However, in the above stated layout in which the electric generator and the engine for actuating the electric generator are arranged in the vehicle width direction, a unit of the engine and the electric generator having a unitary structure increases in length in the vehicle width direction. As a result, it is difficult to flexibly lay out components in a limited space of the engine room. For example, in multi-purpose vehicles such as a golf cart or a farming truck, the engine room is smaller than those of general vehicles. If the unit of the engine and the electric generator which is elongated in the vehicle width direction is incorporated into the hybrid vehicle, it is difficult to lay out an air-intake system of the engine, an exhaust system of the engine, and auxiliary devices, in a space in the vicinity of the unit. If a wasted space increases because of the layout, it may be difficult to dispose in the engine room, an electric power controller for controlling electric power supply to the electric generator, and other components.

A single-cylinder reciprocating engine is commonly used as the relatively small engine. In that case, vibration generated in the engine tends to be problematic. If the engine is placed such that the cylinder extends vertically as described above, reciprocation of a piston causes a vehicle body to vibrate vertically (up and down), which may make a driver feel discomfort. In the multi-purpose vehicle having a relatively simple vehicle body structure, such as a golf cart, it is not easy to suppress the vibration generated in the engine from being transmitted to the vehicle body. As a result, the driver may feel substantial vibration.

SUMMARY OF THE INVENTION

The present invention addresses the above described condition, and an object of the present invention is to devise a layout of an engine and an electric generator in an engine room of a hybrid vehicle so that auxiliary devices and other components can be positioned more flexibly, and vibration felt by the driver or passenger can be lessened.

According to the present invention, a hybrid vehicle including an engine, an electric generator joined to the engine, and an electric drive motor, comprises a driver seat on which a driver is seated; and an engine room provided forward or rearward relative to the driver seat; wherein the engine is placed such that a crankshaft extends vertically, and a rotor of the electric generator is mounted to an upper end portion or a lower end portion of the crankshaft such that the rotor is rotatable integrally with the crankshaft.

Typically, a unit assembly of the engine and the electric generator tends to be elongated in the direction in which the crankshaft extends. In the hybrid vehicle of the present invention, the engine is placed such that its lengthwise direction conforms to a vertical direction. This placement allows an air-intake system, an exhaust system, auxiliary devices, and other components to be laid out in a space in the vicinity of the engine and the electric generator. Because of the efficient use of a limited space of the engine room, electric power controllers and the like can be placed in the engine room. Since the crankshaft extends vertically, reciprocation of a piston is less likely to generate a substantial vertical vibration of the vehicle body, thereby lessening the vibration felt by the driver.

For example, the engine may be placed such that a cylinder extends rightward or leftward and in an obliquely forward and rearward direction. This allows the vibration generated by reciprocation of the piston to be applied to the vehicle body in an obliquely forward and rearward direction, and in an obliquely rightward and leftward direction, rather than in a forward and rearward direction or in a rightward and leftward direction. Since the vibration is dispersed in the forward and rearward direction and in the rightward and leftward direction, the vibration felt by the driver can be further lessened.

The electric drive motor and a driving power transmission mechanism for transmitting a driving power of the electric drive motor to right and left wheels may be arranged in the engine room. Since the limited space of the engine room can be efficiently utilized, the engine, the electric generator, the electric drive motor, and the driving power transmission mechanism, which tend to generate vibration and noise, can be accommodated collectively in the engine room. As a result, the driver or passenger does not feel discomfort.

The engine, the electric generator, the electric drive motor, and the driving power transmission mechanism may be mounted to a common sub-frame to form an assembly mounted to the vehicle body. In other words, the engine and the electric generator which generate vibration, the driving power transmission mechanism and the electric drive motor which are applied with a reactive force of torque from wheels, and the like are assembled to the common sub-frame. By mounting the sub-frame to the vehicle body via elastic mounts, it is possible to effectively suppress the vibration from being transmitted to the vehicle body. In addition, cost will not increase as compared to a case where these components are individually mounted to the vehicle body via the elastic mounts. Of course, these components assembled to the sub-frame can be mounted to the vehicle body more easily.

In this case, the engine may be placed such that a cylinder extends rightward or leftward in a portion of the engine room; and the electric drive motor may be positioned at an opposite side (the other side) in a rightward and leftward direction relative to the crankshaft of the engine. This allows a weight balance in the rightward and leftward direction to be easily maintained in the state where the engine, the electric generator and the electric drive motor are mounted to the sub-frame to form the assembly. In addition, vibration can be lessened effectively, and the assembly can be mounted to the vehicle body easily and efficiently.

When the engine is placed such that a cylinder extends rightward or leftward in a portion of the engine room, a controller for controlling at least one of the electric generator and the electric drive motor may be positioned in a portion of the engine room which is at the opposite side (the other side) of the portion where the cylinder extends, in the rightward and leftward direction. Since the controller can be positioned in close proximity to the electric generator and the electric drive motor in the above efficient layout in the engine room, electric power lines through which a large current flows can be reduced in length, and maintenance of the components can be performed easily and efficiently. Moreover, since the cylinder of the engine which tends to elevate its temperature is positioned in the right part or in the left part of the engine room to be distant from the controller, the controller can be protected from heat.

The rotor of the electric generator may be mounted to a lower end portion of the crankshaft of the engine. Because of this structure, even when high-temperature air in the vicinity of the engine moves up by convection, during a stopped state of the hybrid vehicle, the temperature of the electric generator located downstream of the engine will not rise.

The engine room may be provided below a cargo bed disposed behind the driver seat. A relatively wide space can be provided for the engine room in the rear portion of the vehicle body, because a steering system is not provided in the rear portion of the vehicle body, and suspensions of rear wheels can be configured simply in the rear portion of the vehicle body. In addition, gas and heat emitted from the engine is less likely to be transmitted to a space where the driver or passenger is present.

In this case, especially, when the engine is placed such that a cylinder extends rightward or leftward and in an obliquely rearward direction, the vibration felt by the driver can be lessened effectively, and the components generating heat are distant from the space where the driver or passenger is present.

The above and further objects, features and advantages of the invention will more fully be apparent from the following detailed description with reference to the accompanying drawings.

DETAILED DESCRIPTION OF THE PREFERRED EMBODIMENTS

Figure 1:
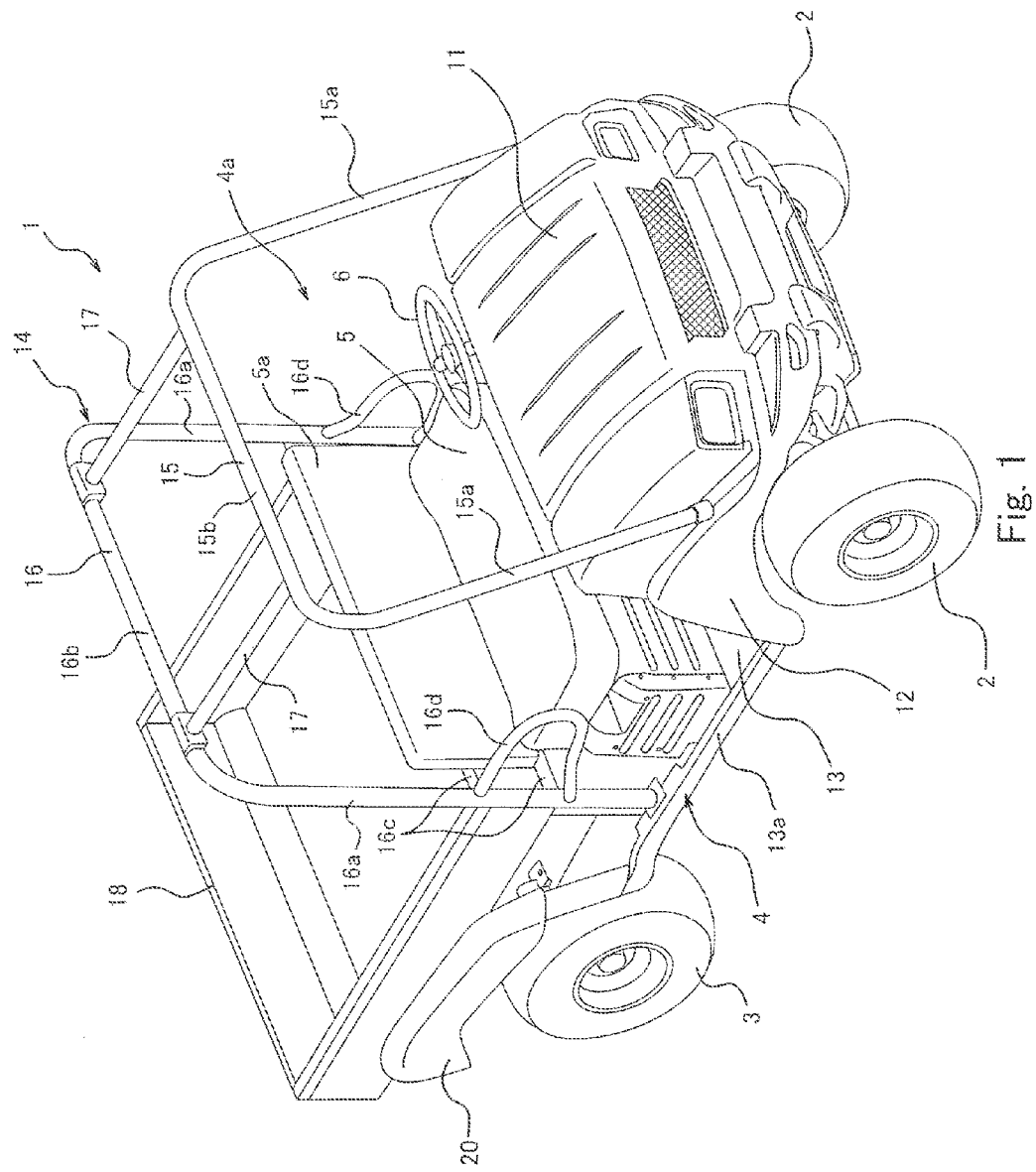
FIG. 1 is a perspective view of a hybrid vehicle according to an embodiment of the present invention, when viewed from leftward and obliquely forward.

Hereinafter, an embodiment of the present invention will be described with reference to the drawings. Throughout the drawings, the same or corresponding components are identified by the same reference numerals and will not be described in repetition. The stated directions are referenced from the perspective of a driver riding in a hybrid vehicle.

Figure 2:
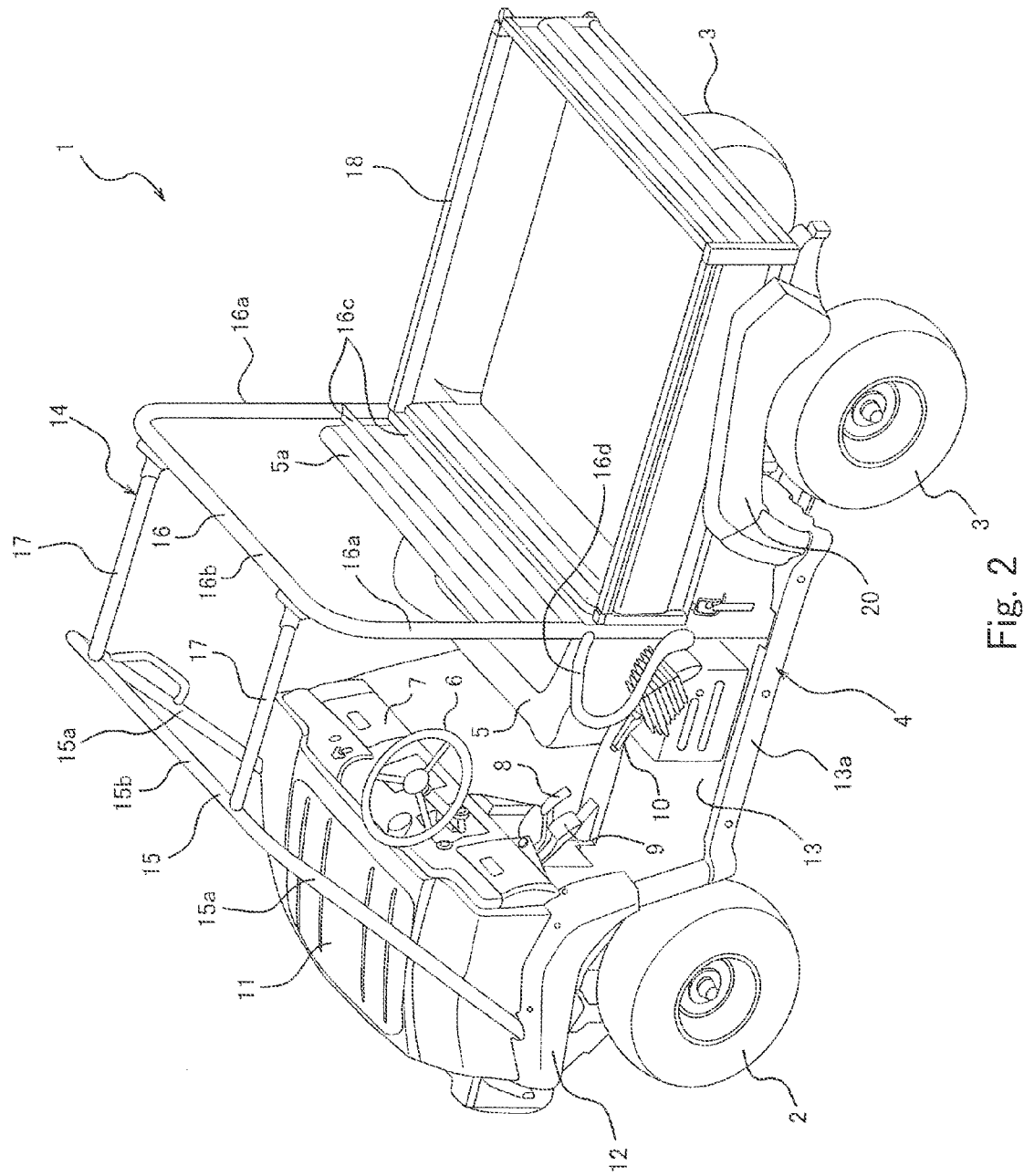
FIG. 2 is a perspective view of the hybrid vehicle, when viewed from rightward and obliquely rearward.
Figure 3:
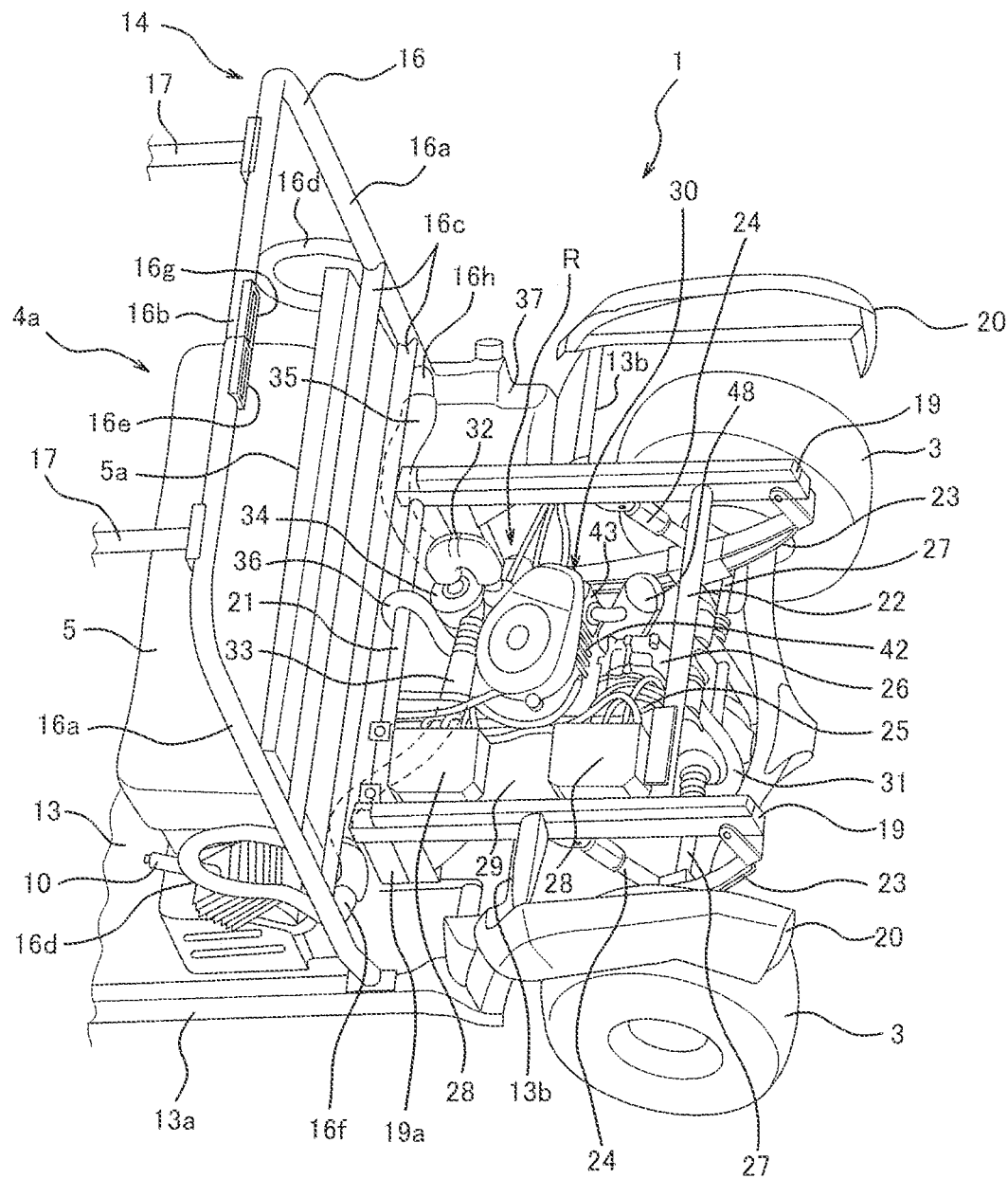
FIG. 3 is a view of the hybrid vehicle corresponding to FIG. 2, showing the interior of an engine room, in a state where a cargo bed is detached.
Figure 4:
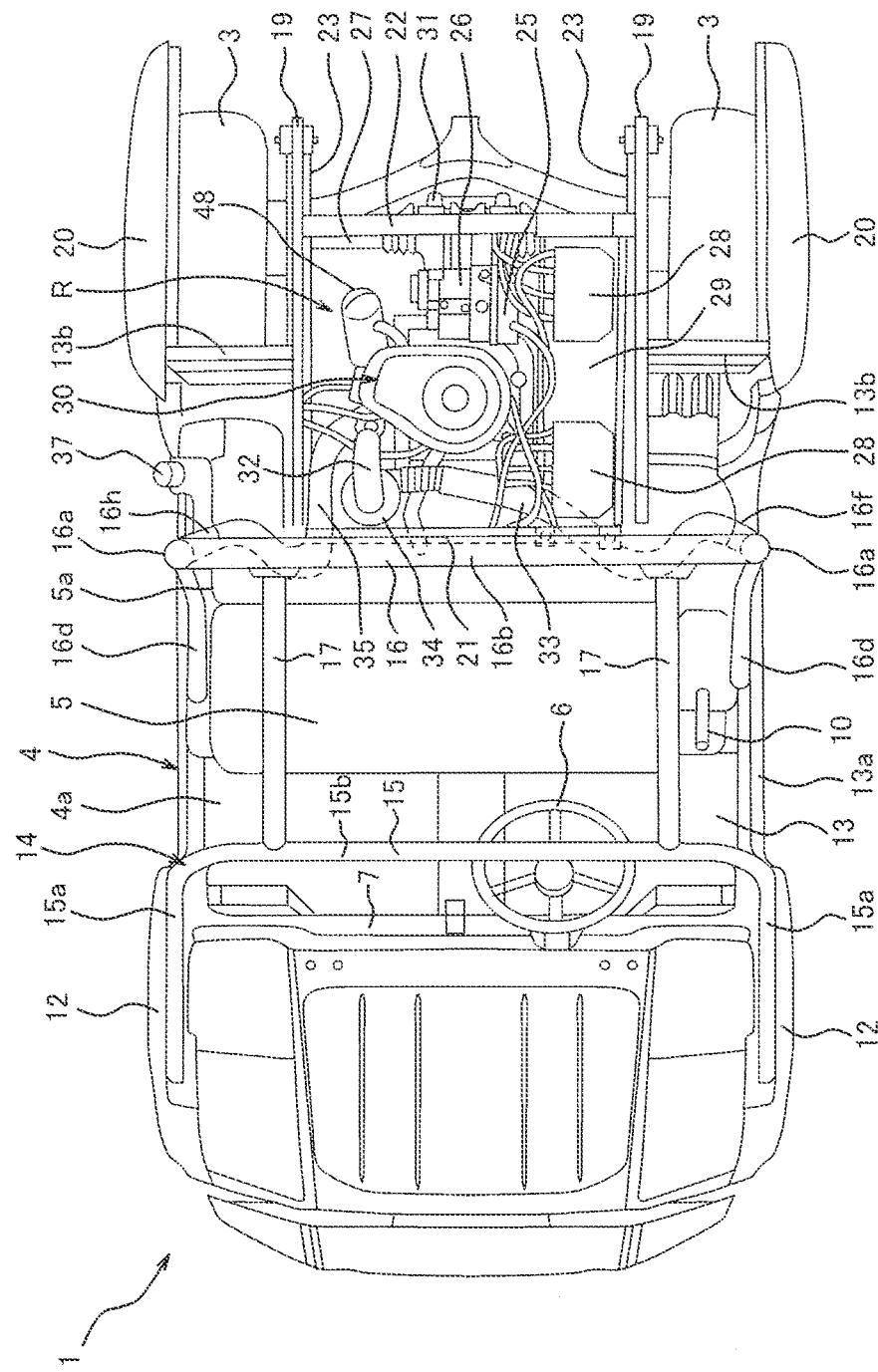
FIG. 4 is a plan view of the hybrid vehicle, showing the interior of the engine room, in a state where the cargo bed is detached.

FIGS. 1 and 2 are perspective views of an external appearance of a utility vehicle 1 which is an embodiment of the hybrid vehicle according to the present invention. FIGS. 3 and 4 are a perspective view and a plan view of the utility vehicle 1, respectively, showing the interior of an engine room, in a state where a cargo bed is detached. Referring to FIGS. 1 and 2, the utility vehicle 1 includes right and left front wheels 2, right and left rear wheels 3, and a vehicle body 4 from which the wheels 2 and 3 are suspended. A cabin space 4a for passengers is provided in a center portion of the vehicle body 4 in a forward and rearward direction (lengthwise direction of the utility vehicle 1). A bench seat 5 (driver seat) which is laterally elongated is provided in a substantially center portion of wheel bases of the front and rear wheels 2 and 3. As used herein, the utility vehicle refers to a multi-purpose vehicle, for example, a golf cart, a farming truck, etc.

The front wheels 2 of the utility vehicle 1 are steering wheels and are turned to the right or to the left according to driver's steering of the handle 6. As shown in FIG. 2, the handle 6 is supported on a handle post extending upward from the dash board 7 such that it is tilted slightly rearward. Below the handle 6, an accelerator pedal 8 and a brake pedal 9 are provided. The driver seated on a left portion of the seat 5 can depress the accelerator pedal 8 or the brake pedal 9, while gripping the handle 6. A side brake lever 10 is provided in the vicinity of the left end of the seat 5 to allow the driver to easily operate the side brake lever 10 with a left hand.

The front portion of the vehicle body 4 which is forward relative to the cabin space 4a is covered with a hood 11 extending forward from the upper end of the dash board 7. Front fenders 12 are provided at right and left sides of the hood 11 such that the front fenders 12 are disposed at lower levels than the hood 11 and cover the outer portions of the right and left wheels 2, respectively, from above. Below the hood 11, there are provided front suspension devices (not shown) which suspend the right and left front wheels 2 such that the right and left front wheels 2 are vertically pivotable, and a steering device (not shown) for turning the front wheels 2 according to the driver's steering of the handle 6. In addition, there are provided a front drive motor (not shown) which is an electric motor for driving the front wheels 2, a reduction gear mechanism and a differential gear mechanism (not shown) for transmitting a driving power of the front drive motor, etc.

In brief, the utility vehicle 1 of the present embodiment is a four-wheel-drive vehicle configured to drive the front wheels 2 by the front drive motor, and drive the rear wheels 3 by a rear drive motor 25 as described later. The utility vehicle 1 has an excellent driving mobility on unpaved roads, and can achieve high fuel efficiency by actuating the front drive motor or the rear drive motor 25, or the front drive motor and the rear drive motor 25, depending on a driving state.

A floor panel 13 extends rearward from the lower end of the dash board 7 in the cabin space 4a. Although not shown, there are provided on the lower surface of the floor panel 13 a pair of right and left main frames sandwiching a center member extending in a forward and rearward direction, in a substantially center portion of the lower surface, and floor side frames constituted by, for example, round pipe members extending along side sills 13a at right and left edges of the floor panel 13, respectively, to provide desired floor stiffness. A cabin frame 14 is provided to define the right and left ends and the upper end of the cabin space 4a. The cabin frame 14 is a roll cage (ROPS).

Referring to FIGS. 1 and 2, the cabin frame 14 includes a substantially-U-shaped front frame member 15 defining the front of the cabin space 4a, and a substantially-U-shaped rear frame member 16 defining the rear of the cabin space 4a. The front frame member 15 includes a pair of right and left support elements 15a extending upward from the right and left front fenders 12, respectively, such that the support elements 15a are tilted in a slightly rearward direction, and a cross beam 15b provided between and coupled to the upper ends of the support elements 15a. The support elements 15a and the cross beam 15b are constituted by, for example, round pipes and have a unitary structure. Likewise, the rear frame member 16 includes a pair of right and left support elements 16a, and a cross beam 16b provided between and coupled to the upper ends of the support elements 16a. The support elements 16a and the cross beam 16b are constituted by, for example, round pipes and have a unitary structure. The support elements 16a extend upward in a substantially vertical direction from the rear portions of the right and left side sills 13a of the floor panel 13, respectively. A pair of right and left longitudinal beams 17 are provided between and coupled to the cross beam 15b of the front frame member 15 and the cross beam 16b of the rear frame member 16.

The rear frame member 16 is provided with a pair of upper and lower cross members 16c constituted by, for example, round pipes, in a location lower than a substantially vertical center. The upper and lower cross members 16c are vertically spaced apart from each other and couple the right and left support elements 16a together. A back rest 5a of the seat 5 is mounted to the cross members 16c. Side guards 16d having a substantially U-shape when viewed from the side are provided to extend forward from the rear support elements 16a, respectively, such that the side guards 16d substantially correspond to a range between the upper and lower cross members 16c.

A cargo bed 18 is provided behind and near the cabin space 4a defined by the cabin frame 14 as described above. The cargo bed 18 is substantially as high as the upper and lower cross members 16c. The cargo bed 18 is constituted by, for example, a plurality of steel plates joined together in a rectangular shape. The cargo bed 18 is pivotable upward around a pivot shaft attached to the rear edge of the cargo bed 18. As can be seen from FIG. 3, showing a state where the cargo bed 18 is detached, a pair of right and left rear side frames 19 are coupled to the rear portion of the floor panel 13 via a pair of coupling members 19a having a rectangular thick plate shape. The rear side frames 19 extend rearward straightly such that the rear side frames 19 are higher than the floor panel 13. The cargo bed 81 is mounted to the upper portions of the rear side frames 19.

The rear side frames 19 are constituted by, for example, square pipe members having a rectangular cross-section. As shown in FIGS. 3 and 4, the rear wheels 3 are disposed outside of the right and left rear side frames 19 in the vehicle width direction, respectively, and rear fenders 20 are provided to cover the outer portions of the rear wheels 3, respectively, from above. Panels 13b are provided forward relative to the rear wheels 3, such that they extend upward and are tilted in a slightly rearward direction from a location a little behind the rear edge of the floor panel 13.

An engine room R is defined inward relative to the right and left rear side frames 19 in the vehicle width direction. A cross member 21 is provided between and coupled to the front end portions of the right and left rear side frames 19. A cross member 22 is provided between and coupled to the rear end portions of the right and left rear side frames 19 such that the cross member 22 overlaps with the axle of the rear wheels 3 when viewed from above. The cross members 21 and 22 are constituted by, for example, round pipes. The front and rear cross members 21 and 22, and the right and left rear side frames 19 constitute a frame assembly defining the engine room R. The frame assembly has a rectangular shape and has a high stiffness.

Since the engine room R is provided behind the cabin space 4a, i.e., behind the seat 5, a wide space can be ensured easily as the engine room R, because a steering system is not provided in the rear portion of the vehicle body 4, the suspensions of the rear wheels 3 can be configured simply in the rear portion of the vehicle body 4. In addition, this layout has an advantage that exhaust gas and heat emitted from the engine 40 are not substantially transmitted to the cabin space 4a.

As shown in FIG. 3, the rear end portions of leaf springs 23 of the rear suspension devices for suspending the rear wheels 3 are mounted to the rear ends of the right and rear side frames 19, respectively. The leaf springs 23 extend forward and obliquely downward from the rear ends of the rear side frames 19 to which the leaf springs 23 are mounted. The front end portions of the leaf springs 23 are coupled to the rear ends of the floor panel 13, respectively, although not shown. Hubs of the rear wheels 3 are attached to the center portions of the leaf springs 23, respectively, and the lower end portions of hydraulic dampers 24 are attached to the center portions of the leaf springs 23, respectively such that the hydraulic dampers 24 are pivotable. The upper end of each of the hydraulic dampers 24 is coupled to the center portion of the corresponding rear side frame 19 in the forward and rearward direction such that the hydraulic damper 24 is pivotable. The hydraulic dampers 24 are extendable and contractible according to the vertical movement of the rear wheels 3, respectively.

As shown in FIGS. 3 and 4, the engine room R accommodates the rear wheel drive motor 25 which is an electric motor for driving the rear wheels 3, and the rear transaxle 26 including the transmission gear mechanism and the differential gear mechanism for transmitting a driving power of the rear drive motor 25, and a pair of front and rear controllers 28 for controlling electric power supply to the front drive motor and to the rear drive motor 25, respectively. The pair of front and rear controllers 28 are placed on a metal-made tray 29 in close proximity to the inner side of the left rear side frame 19 such that they are spaced apart from each other in the forward and rearward direction.

The controllers 28 are coupled to a battery (not shown) positioned below the seat 5 in the cabin space 4a, and are coupled to the front drive motor and to the rear drive motor 25, respectively. The controllers 28 are further coupled to an engine electric generator 30 as described later. Since the controllers 28 are positioned in the vicinity of the battery, the rear drive motor 25 and the engine electric generator 30 such that they are interconnected via the controllers 28, electric power lines through which a large current flows can be reduced in length, and maintenance of the components can be performed easily and efficiently.

—Engine Electric Generator—

Figure 5:
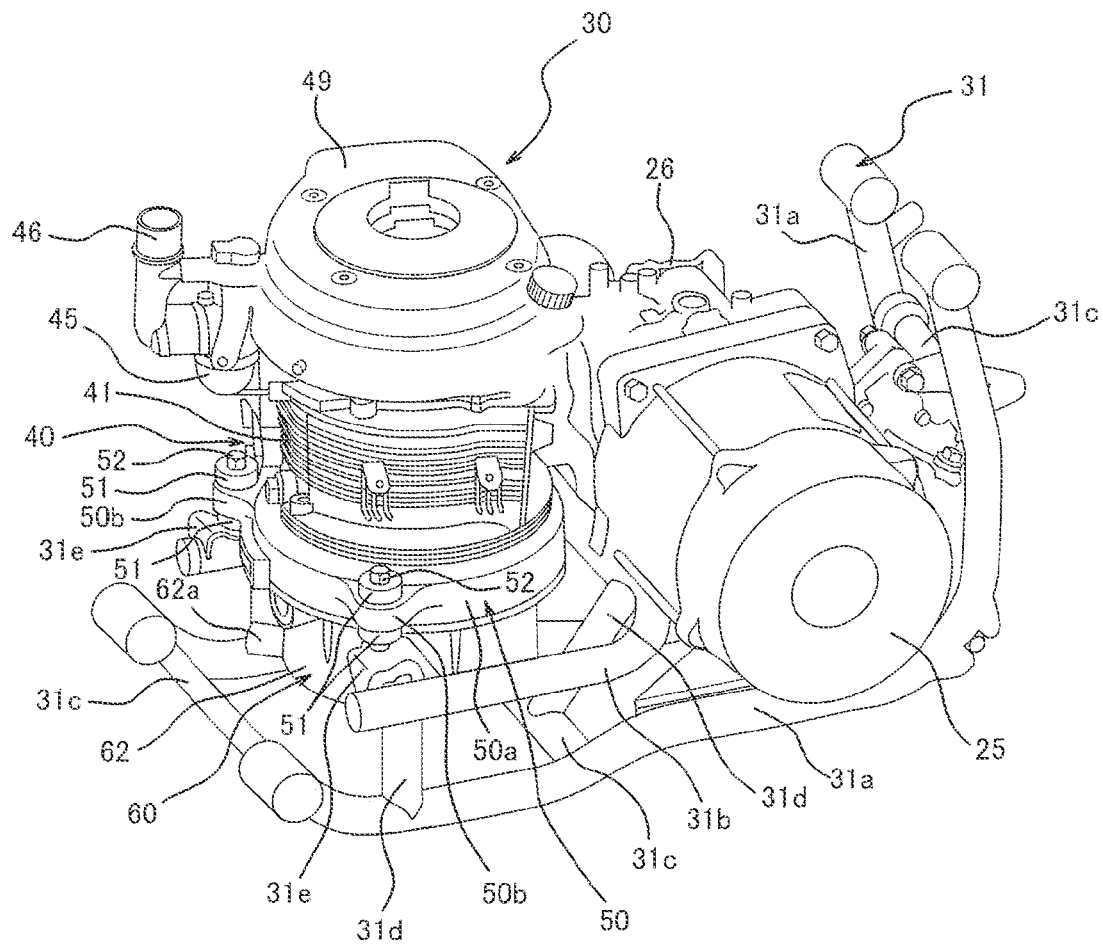
FIG. 5 is a perspective view of an assembly of an engine electric generator and a rear wheel drive motor which are mounted to a sub-frame.

The engine electric generator 30 is activated according to an SOC (state of charge) value of the battery, etc., to generate electric power supplied to the rear drive motor 25. As shown in FIGS. 5~8, the engine electric generator 30 is placed such that a crankshaft 39 (indicated by a broken line in FIG. 6) of an engine 40 is oriented to extend vertically. As shown in FIG. 5, the engine electric generator 30, the rear drive motor 25 and the rear transaxle 26 are mounted to the sub-frame 31 to form an assembly. As shown in FIGS. 3 and 4, the assembly is positioned at a substantially center portion of the engine room R.

The sub-frame 31 includes, for example, a pair of right and left main frame members 31a constituted by round pipe members curved in a substantially-J-shape, and a sub-frame member 31b having a U-shape when viewed from above. The right and left main frame members 31a are coupled together by means of three stays 31c spaced apart from each other in the forward and rearward direction. The front end portions of the main frame members 31a are coupled to the rear edge of the floor panel 13 in the cabin space 4a via cylindrical elastic bushes (not shown), while the upper end portions thereof are coupled to the rear cross member 22 via cylindrical elastic bushes (not shown).

In a rear half portion of the sub-frame 31, the rear transaxle 26 is placed within curved portions of the main frame members 31a curved in a substantially-J-shape, and is fastened thereto by means of bolts. The rear drive motor 25 is coupled to the left portion of the rear transaxle 26 such that its rotational shaft is oriented in a rightward and leftward direction. The substantially entire part of the rear drive motor 25 protrudes from the sub-frame 31 to the left. As shown in FIGS. 3 and 4, drive shafts 27 extend from the rear transaxle 26 to the right and left rear wheels 3, respectively.

Turning back to FIG. 5, in a front half portion of the sub-frame 31, the sub-frame member 31b is provided to correspond to a range between the right and left main frame members 31a. The sub-frame member 31b has a U-shape which is open forward when viewed from above. The sub-frame member 31b is provided above the main frame members 31a and coupled to the main frame members 31a by means of a plurality of stays 31d and the stays 31c. Support base members 31e of the engine electric generator 30 are provided at the front end portions of the sub-frame member 31b, which are open end portions of the U-shape, and the rear end portion of the sub-frame member 31b which is the bottom of the U-shape.

Figure 6:
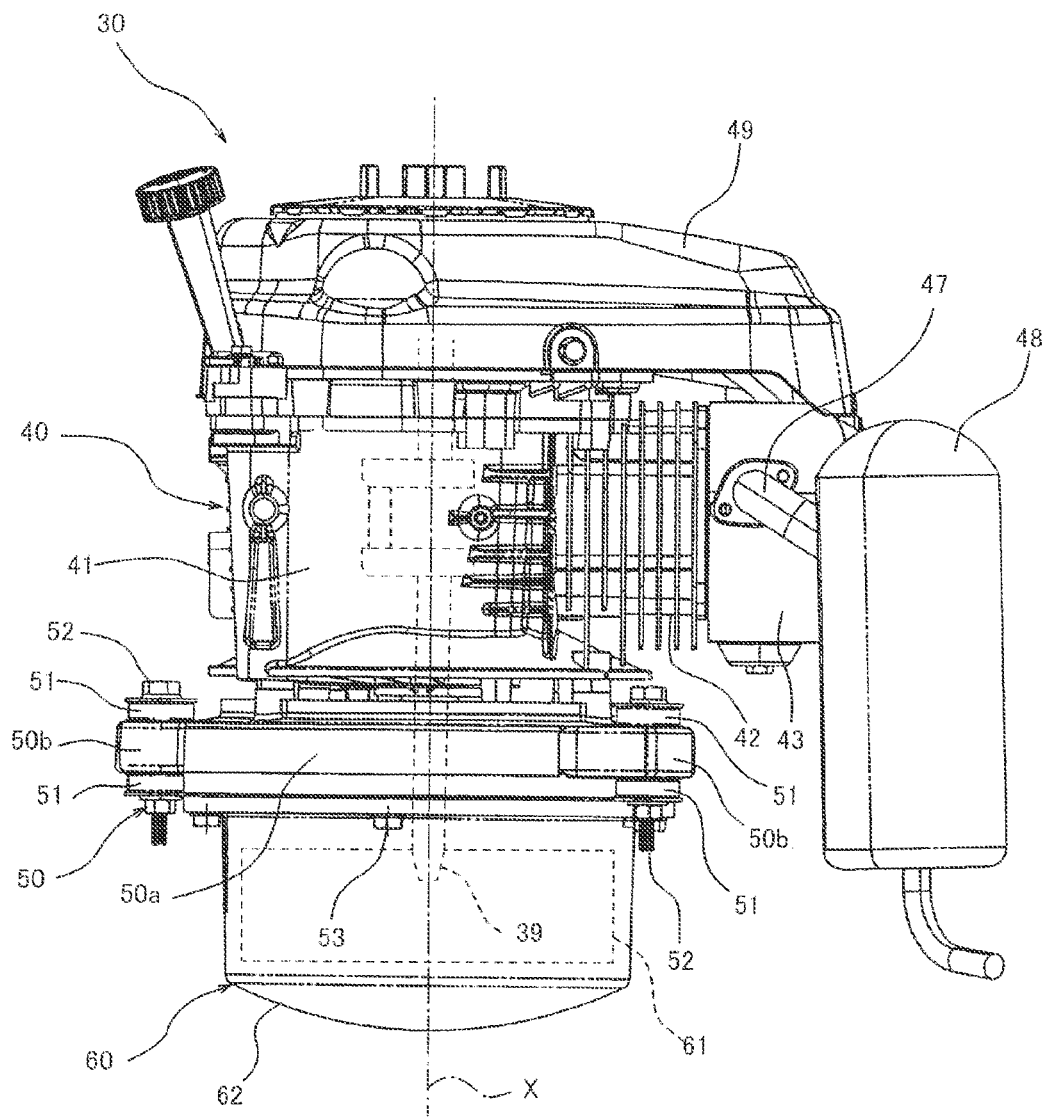
FIG. 6 is a side view of the engine electric generator when viewed from an exhaust system side of the engine.
Figure 7:
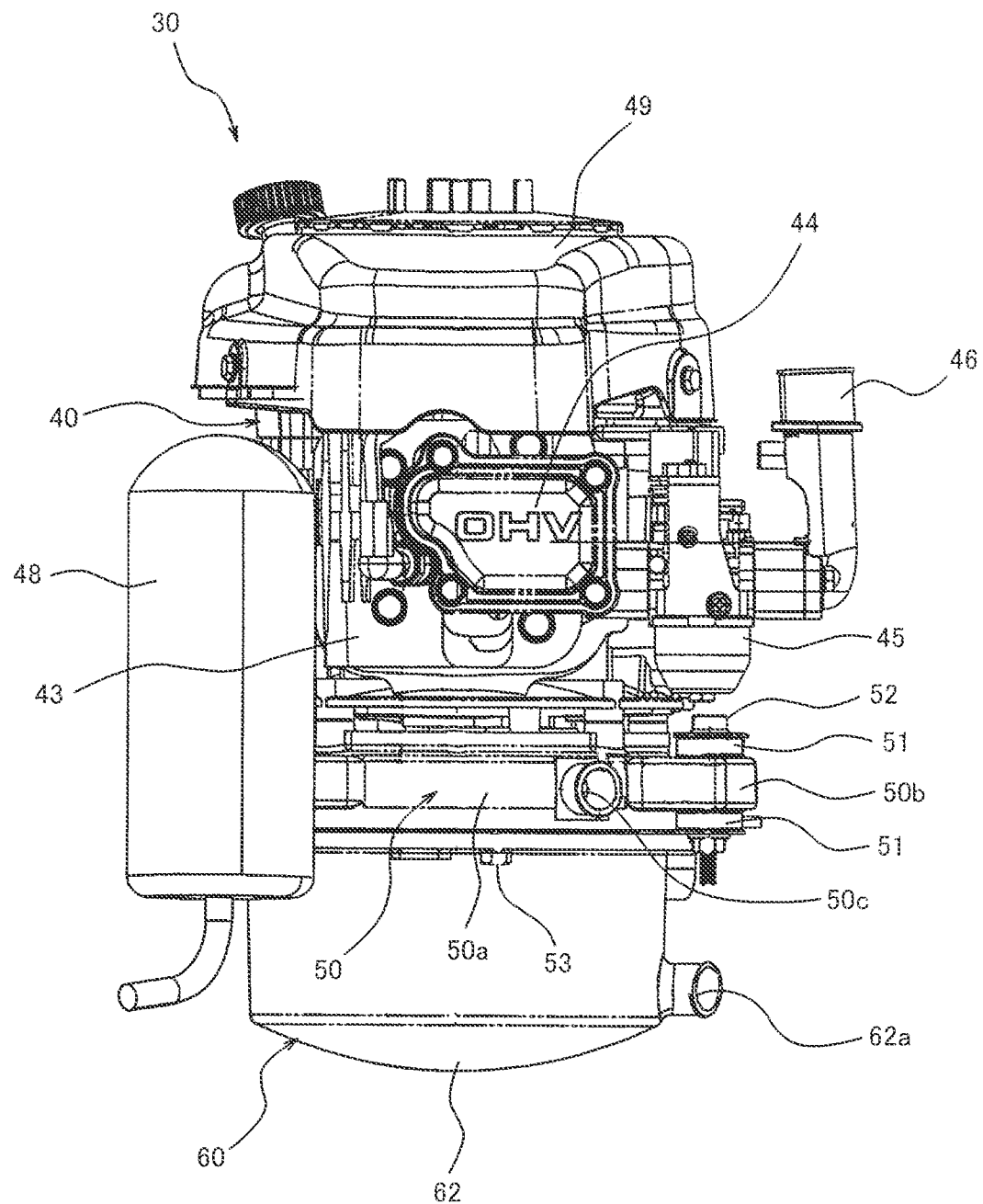
FIG. 7 is a side view of the engine electric generator when viewed from a cylinder head side of the engine.
Figure 8:
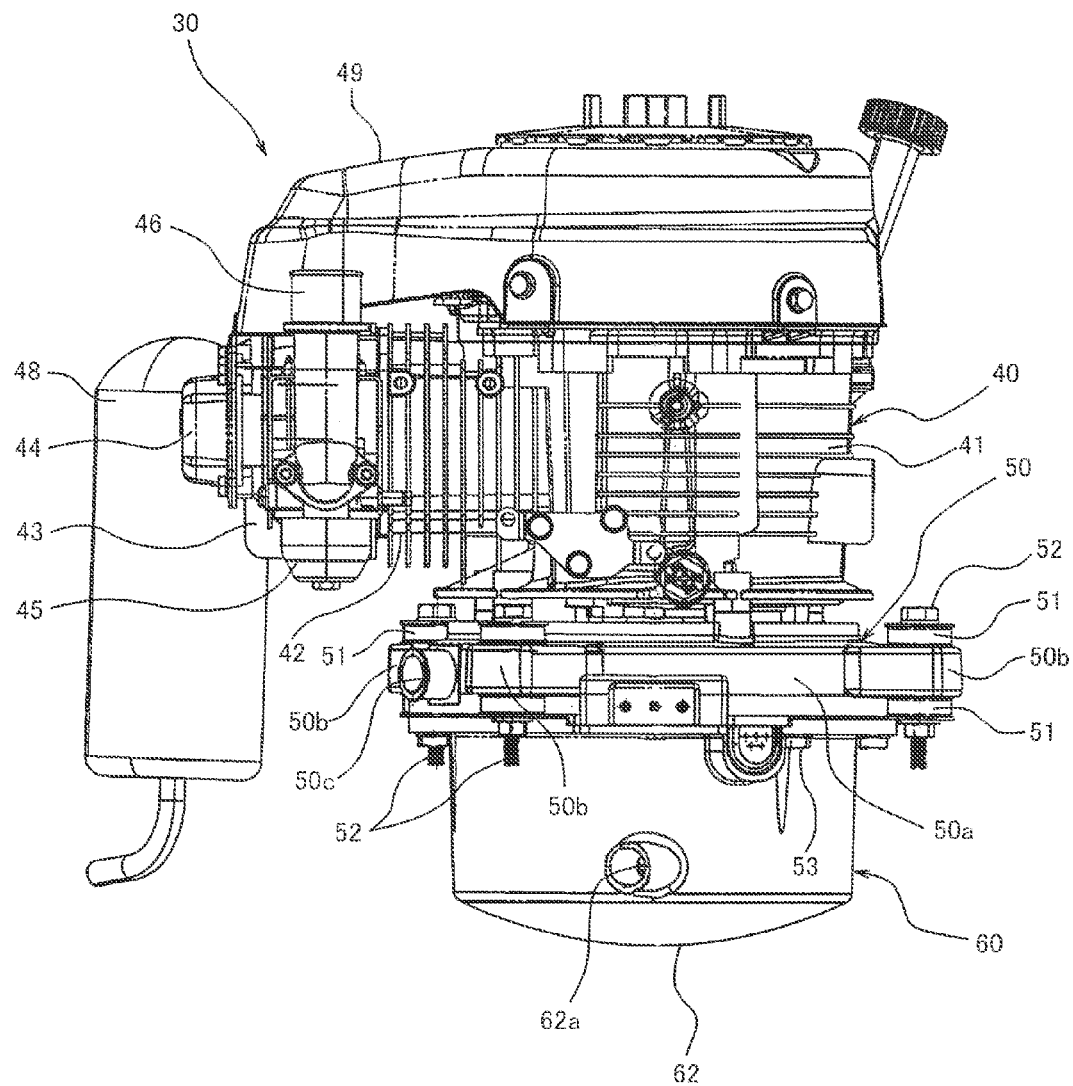
FIG. 8 is a side view of the engine electric generator when viewed from an air-intake system side of the engine.

As shown in FIGS. 5, and 6~8, the engine electric generator 30 has a configuration in which a cylinder of a single-cylinder reciprocating engine 40 is placed horizontally, and an electric generator 60 is coupled integrally to the lower portion of a crankcase 41 via a spacer member 50. The lower end portion of the crankshaft 39 (FIG. 6) protrudes from the crankcase 41. FIGS. 6 to 8 are a side view of the engine electric generator 30 when viewed from the exhaust system side of the engine 40, a side view of the engine electric generator 30 when viewed from the cylinder head 43 side of the engine 40, and a side view of the engine electric generator 30 when viewed from the air-intake system side of the engine 40, respectively. In FIG. 6, the crankshaft 39 and the rotor 61 of the electric generator 60 are indicated by broken lines.

In the present embodiment, the main body of the engine 40 has a configuration in which the cylinder head 43 is mounted to the right end of the cylinder block 42 extending substantially to the right from the crankcase 41. A head cover 44 is attached to the cylinder head 43. As shown in FIGS. 3 and 4, the engine electric generator 30 is placed in the engine room R such that the cylinder block 42 and the cylinder head 43 of the engine 40 extend in an obliquely rightward and rearward direction from the crankcase 41. Because of this layout, vibration generated by reciprocation of the piston is applied to the vehicle body 4 in an obliquely forward and rearward direction and in an obliquely rightward and leftward direction.

A carburetor 45 and an air-intake pipe 46 are coupled to the front portion of the cylinder head 43 positioned in a relatively right part of the engine room R. Outside air is suctioned into the cylinder via the air-intake ducts 32 and 33 and the air cleaner 34 (not shown in FIGS. 6~8). An exhaust pipe 47 and a muffler 48 are attached to the rear portion of the cylinder head 43 to exhaust combustion gas from the cylinder. That is, in the engine room R, in a space rightward relative to the engine electric generator 30, the air-intake system is positioned in a front region closer to the cabin space 4a, and the exhaust system which tends to elevate its temperature is positioned in a rear region distant from the cabin space 4a.

As shown in FIGS. 3 and 4, the upper end of the air-intake pipe 46 is coupled to the coupling portion of the upper end portion of the air cleaner 34 via the downstream air-intake duct 32 of a substantially-inverted-U shape, while the upstream air-intake duct 33 is coupled to the coupling portion of the rear portion of the air cleaner 34 and extends to the left. The air-intake duct 33 extends through a space under a tray 29 of the controllers 28 and then outward from a left front corner of the engine room R, and is coupled to the lower end portion of the support element 16a of the rear frame member 16 of the cabin frame 14.

To be specific, in the utility vehicle 1 of the present embodiment, the interior of the left portion of the round pipe member constituting the rear frame member 16 of the cabin frame 14 is used as an air passage. As can be seen from FIG. 3, an air inlet 16e opens in a portion of the cross beam 16b of the rear frame member 16, which is leftward relative to the center of the cross beam 16b, while an air outlet 16f is provided at the lower end portion of the left support element 16a of the rear frame member 16. The upstream air-intake duct 33 is coupled to the air outlet 16f.

An air inlet 16g opens in the cross beam 16b at the right side of the air inlet 16e adjacent to the air outlet 16e. An air outlet 16h is provided at the lower end portion of the right support element 16a. The cooling air intake duct 35 is coupled to the air outlet 16h. That is, the right portion of the rear frame member 16 is used to take in the outside air which is supplied to the electric generator 60 as the cooling water.

As indicated by broken lines in FIG. 6, the crankshaft 39 extends vertically inside the crankcase 41. The crankshaft 39 is coupled to the piston slidably inserted into the cylinder via a connecting rod, although not shown. The crankshaft 39 actuates an intake valve and an exhaust valve in the cylinder head 43 via a push rod. The engine 40 includes an OHV valve operating system.

The upper end portion of the crankshaft 39 protrudes upward from the crankcase 41 and a sirocco fan (not shown) is mounted to the upper end portion of the crankshaft 39 such that the sirocco fan is rotatable integrally with the crankshaft 39. The sirocco fan is covered with a cover member 49 made of resin from above and from the side. The cooling air blowing out from the sirocco fan is guided to the cylinder block 42 and to the cylinder head 43 located under the sirocco fan. That is, the engine 40 uses a forcible air-cooling system.

The lower end portion of the crankshaft 39 protrudes downward from the crankcase 41. The rotor 61 of the electric generator 60 is mounted to the lower end portion of the crankshaft 39 such that the rotor 61 is rotatable integrally with the crankshaft 39. As descried above, the case 62 of the electric generator 60 is mounted to the lower portion of the crankcase 41 of the engine 40 via a spacer member 50 of a substantially disc-shape. The rotor 61 is accommodated in the case 62. The spacer member 50 is fastened to the crankcase 41 by means of bolts, while an opening peripheral portion of the case 62 of the electric generator 60 is fastened to the lower end surface of a peripheral wall portion 50a in plural locations circumferentially spaced apart from each other, by means of bolts 53.

The spacer 50 joins the engine 40 and the electric generator 60 in the above described manner. The spacer member 50 is fastened to the sub-frame 31 by the protruding portions 50*b* provided on the outer periphery of the peripheral wall portion 50*a* and serves to support the overall engine electric generator 30. The protruding portions 50*b* protrude radially outward from predetermined three portions of the outer periphery of the spacer member 50. The protruding portions 50*b* are placed on the support base members 31*e* of the sub-frame member 31*b* of the sub-frame 31 via rubber mounts 51, respectively, and are fastened thereto by means of bolts 52.

As shown in FIGS. 7 and 8, an air inlet 50*c* is provided on the outer periphery of the spacer member 50. The air-intake duct 35 is coupled to the air inlet 50*c*. An air outlet 62*a* is provided on the outer periphery of the case 62 of the electric generator 60. An air discharge duct 36 is coupled to the air outlet 62*a*. As shown in FIGS. 3 and 4, the air discharge duct 36 extends from the air outlet 62*c*, forward and in an obliquely upward direction, from the engine electric generator 30 and is then curved to be wound around the cross member 21 coupling the front end portions of the rear side frames 19, and then opens vertically downward. In FIGS. 3 and 4, reference symbol 37 designates a fuel tank for storing a fuel supplied to the engine 40.

The engine electric generator 30 which is the unit of the engine 40 and the electric generator 60 tends to be elongated in the direction in which the crankshaft 39 extends. In the utility vehicle 1 of the present embodiment, the engine electric generator 30 is placed in the engine room R such that its lengthwise direction conforms to the vertical direction, i.e., the crankshaft 39 extends vertically. This makes it possible to easily lay out the air-intake system, the exhaust system, and the auxiliary devices in spaces surrounding the engine electric generator 30. To be specific, as shown in FIGS. 3 and 4, the air-intake system can be laid out efficiently in a space forward and rightward relative to the engine electric generator 30, while the exhaust system can be laid out efficiently in a space which is rightward and rearward relative to the engine electric generator 30 which is distant from the cabin space 4*a*.

The rear drive motor 25 and the rear transaxle 26 can be positioned in close proximity to the engine electric generator 30 behind the engine electric generator 30. The controllers 28 for controlling the electric power supply to the engine electric generator 30 and to the rear drive motor 25 can be laid out at the left side of the engine electric generator 30 in the engine room R. That is, the controllers 28, as well as the engine electric generator 30, and the rear drive motor 25, can be laid out in a limited space of the engine room R. In this way, the driver or passenger can be protected from heat emitted from the engine 40.

The cylinder block 42 and the cylinder head 43 of the engine 40 which tend to elevate their temperatures are positioned in a relatively right part of the engine room R, while the controllers 28 and other components are positioned in a relatively left part of the engine room R. In this way, the controllers 28 and other components can be protected from heat. Since the cylinder block 42 and the cylinder head 43 are oriented to extend in the obliquely rightward and rearward direction so that they are distant from the cabin space 4*a*, the driver or passenger can be protected from the heat emitted from the engine 40.

Since the cylinder block 42 and the cylinder head 43 of the engine 40 are oriented to extend in the obliquely rightward and rearward direction, vibration attributed to the reciprocation of the piston is directed in the rightward and leftward direction or in a slightly obliquely forward and rearward direction. In general vehicles, a horizontal vibration is less likely to be felt by the driver or passenger, as compared to a vertical vibration. In the above layout, the vibration is dispersed in the forward and rearward direction in addition to the rightward and leftward direction. Thus, vibration felt by the driver or passenger can be mitigated.

The vibration felt by the driver or passenger can be also mitigated as follows. As described above, the rear drive motor 25, the rear transaxle 26, and the engine electric generator 30 are mounted to the common sub-frame 31, to form the assembly which is mounted to the vehicle body 4 via the elastic bushes. The engine 40 generating vibration, the rear transaxle 26 applied with a reactive force of drive torque from the rear wheels 3, and the like are assembled to the common sub-frame 31 and mounted to the vehicle body 4 via the elastic mounts. Such an arrangement makes it possible to effectively suppress the vibration from being transmitted to the vehicle body 4 without increasing cost, as compared to a configuration in which the rear drive motor 25, the rear transaxle 26, and the engine electric generator 30 are individually mounted to the vehicle body 4 via the elastic mounts, respectively.

In the engine electric generator 30, the rear drive motor 25 and the like assembled to the common sub-frame 31, the cylinder block 42 and the like of the engine 40 protrude to the right, while the rear drive motor 24 protrudes to the left. With the assembly of these components incorporated into the utility vehicle 1, a weight balance in the rightward and leftward direction is easily maintained. This layout can effectively suppress vibration of the engine 40 or the like. This layout also has an advantage that the engine electric generator 30, the rear drive motor 25 and others can be mounted to the vehicle body 4 easily.

Moreover, in the present embodiment, the electric generator 60 is disposed in the lowermost portion of the engine electric generator 30 elongated in the vertical direction. Therefore, even when high-temperature air in the vicinity of the engine 40 moves up by convection, during a stopped state of the utility vehicle 1, the temperature of the electric generator 60 located downstream of the engine 40 will not rise. This is very effective in a case where the engine room R is provided below the cargo bed 18, as in the present embodiment.

Other Embodiments

The present embodiment is merely exemplary, and is in no way intended to limit the present invention, its applications and uses. In the present embodiment, in the engine electric generator 30, the cylinder block 42 and the like of the engine 40 extend in the obliquely rightward and rearward direction from a region near the center in the engine room R, the rear drive motor 25 protrudes leftward, and the controllers 28 are positioned in the left part of the engine room R. Alternatively, the cylinder block 42 and the like of the engine 40 may extend leftward, the rear drive motor 25 may protrude rightward, and the controllers 28 may be positioned in the right part of the engine room R.

In a further alternative, the cylinder block 42 and the like of the engine 40 may extend rearward in the engine 40, the rear drive motor 25 may protrude rearward, and the controller 28 may be positioned in a front part of the engine room R.

The rear drive motor 25 may be configured not to entirely protrude leftward relative to the sub-frame 30, but a center of gravity of the rear drive motor 25 and the rear transaxle 26 may be located leftward. All of the rear drive motor 25, the rear transaxle 26, and the engine electric generator 30 need not be mounted to the common sub-frame 31 to form the assembly, but they may be mounted to the vehicle body 4 separately.

The electric generator 60 need not be disposed in the lowermost portion of the engine electric generator 30, but the electric generator 60 may be positioned above the engine 40 in the engine electric generator 30, and the rotor 61 may be fastened to the upper end of the crankshaft 39.

Although in the present embodiment, the engine room R is provided in rear portion of the vehicle body 4, it may be provided in the front portion of the vehicle body 4.

Although in the present embodiment, the utility vehicle 1 has been described so far as an example of the hybrid vehicle including the engine electric generator 30, the hybrid vehicle may be an all terrain vehicle (ATV), a two-wheeled hybrid vehicle, or a three-wheeled hybrid vehicle. The hybrid vehicle is not limited to the series hybrid vehicle, but may be a parallel hybrid vehicle, or a series-parallel hybrid vehicle.

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. A hybrid vehicle comprising:
   an engine;
   an electric generator joined to the engine;
   an electric drive motor for actuating wheels of the vehicle, the electric generator configured to supply electric power to the electric drive motor;
   a driver seat on which a driver is seated; and
   an engine room provided forward or rearward relative to the driver seat;
   wherein the engine is placed such that a crankshaft of the engine extends vertically, and a rotor of the electric generator is mounted to an upper end portion or a lower end portion of the crankshaft such that the rotor is rotatable integrally with the crankshaft; and
   wherein the engine is placed such that a cylinder extends rightward or leftward and in an obliquely forward or rearward direction.

2. The hybrid vehicle according to claim 1, wherein the electric drive motor and a driving power transmission mechanism for transmitting a driving power of the electric drive motor to right and left wheels of the wheels of the vehicle are arranged in the engine room.

3. The hybrid vehicle according to claim 2, wherein the engine, the electric generator, the electric drive motor, and the driving power transmission mechanism are mounted to a common sub-frame to form an assembly mounted to a vehicle body.

4. The hybrid vehicle according to claim 1, wherein the rotor of the electric generator is mounted to the lower end portion of the crankshaft of the engine.

5. The hybrid vehicle according to claim 1, wherein the engine room is provided below a cargo bed disposed behind the driver seat.

6. The hybrid vehicle according to claim 5, wherein the engine is placed such that a cylinder extends rightward or leftward and in an obliquely rearward direction.

7. The hybrid vehicle according to claim 1, further comprising:
   a battery coupled to the electric drive motor, to supply electric power to the electric drive motor;
   wherein the electric generator generates electric power based on SOC of the battery.

8. The hybrid vehicle according to claim 1, where the engine is placed such that a vibration of the engine is dispersed in a rightward or leftward direction and in a forward or rearward direction.

9. The hybrid vehicle according to claim 1, wherein the hybrid vehicle is a parallel hybrid vehicle or a series-parallel hybrid vehicle.

10. The hybrid vehicle according to claim 1, wherein the electric generator is positioned in close proximity to the electric drive motor.

11. The hybrid vehicle according to claim 1,
    wherein an air-intake system and an exhaust system are positioned in spaces which are forward and rearward relative to the engine, or rightward and leftward relative to the engine.

12. The hybrid vehicle according to claim 1,
    wherein the hybrid vehicle is a series hybrid vehicle.

13. A hybrid vehicle comprising:
    an engine;
    an electric generator joined to the engine;
    an electric drive motor for actuating wheels of the vehicle, the electric generator configured to supply electric power to the electric drive motor;
    a drive seat on which a driver is seated; and
    an engine room provided forward or rearward relative to the driver seat;
    wherein the engine is placed such that a crankshaft of the engine extends vertically, and a rotor of the electric generator is mounted to an upper end portion or a lower end portion of the crankshaft such that the rotor is rotatable integrally with the crankshaft; and
    wherein the engine is placed such that a cylinder extends rightward or leftward in a portion of the engine room;
    and the electric drive motor is positioned at an opposite side in a rightward and leftward direction relative to the crankshaft of the engine.

14. The hybrid vehicle according to claim 13,
    wherein the electric drive motor and a driving power transmission mechanism for transmitting a driving power of the electric drive motor to right and left wheels of the wheels of the vehicle are arranged in the engine room; and
    wherein the engine, the electric generator, the electric drive motor, and the driving power transmission mechanism are mounted to a common sub-frame to form an assembly mounted on a vehicle body.

15. A hybrid vehicle including an engine, an electric generator joined to the engine, and an electric drive motor, comprising:
    a driver seat on which a driver is seated; and
    an engine room provided forward or rearward relative to the driver seat;
    wherein the engine is placed such that a crankshaft extends vertically, a cylinder extends rightward or leftward in a portion of the engine room, and a rotor of the electric generator is mounted to an upper end portion or a lower end portion of the crankshaft such that the rotor is rotatable integrally with the crankshaft; and
    a controller for controlling at least one of the electric generator and the electric drive motor is positioned in a portion of the engine room which is at an opposite side of the portion where the cylinder extends, in a rightward and leftward direction.

16. A hybrid vehicle comprising:
    an engine;
    an electric generator joined to the engine;

an electric drive motor for actuating wheels of the vehicle, the electric generator configured to supply electric power to the electric drive motor;

a drive seat on which a driver is seated; and an engine room provided forward or rearward relative to the driver seat;

wherein the engine is placed such that a crankshaft of the engine extends vertically, and a rotor of the electric generator is mounted to an upper end portion or a lower end portion of the crankshaft such that the rotor is rotatable integrally with the crankshaft; and wherein the electric generator is mounted to one of an upper end portion and a lower end portion of the crankshaft, and a fan mounted to the other of the upper end portion and the lower end portion of the crankshaft such that the fan is rotatable integrally with the crankshaft.

17. A hybrid vehicle comprising:

an engine;

an electric generator joined to the engine;

an electric drive motor for actuating wheels of the vehicle, the electric generator configured to supply electric power to the electric drive motor;

a drive seat on which a driver is seated; and an engine room provided forward or rearward relative to the driver seat;

wherein the engine is placed such that a crankshaft of the engine extends vertically, and a rotor of the electric generator is mounted to an upper end portion or a lower end portion of the crankshaft such that the rotor is rotatable integrally with the crankshaft; and wherein the electric generator is mounted to the lower end portion of the crankshaft.

* * * * *